May 1, 1928.
O. P. DOERR ET AL
BEVERAGE DISPENSING APPARATUS
Filed May 24, 1924 3 Sheets-Sheet 2
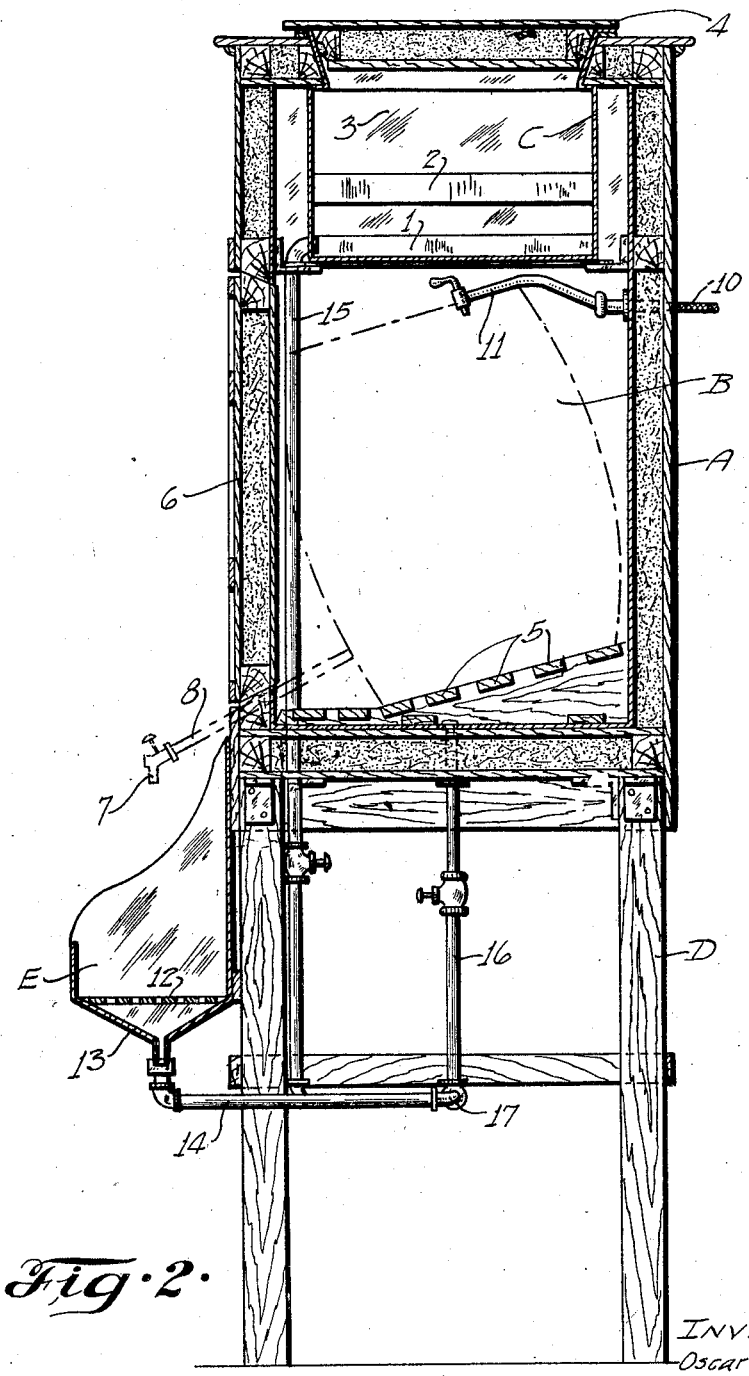
Fig·2·
INVENTORS
Oscar P. Doerr.
William Stolberg.
BY Bakewell & Cherl
ATTORNEYS May 1, 1928.
O. P. DOERR ET AL
1,668,195
BEVERAGE DISPENSING APPARATUS
Filed May 24, 1924
3 Sheets-Sheet 3
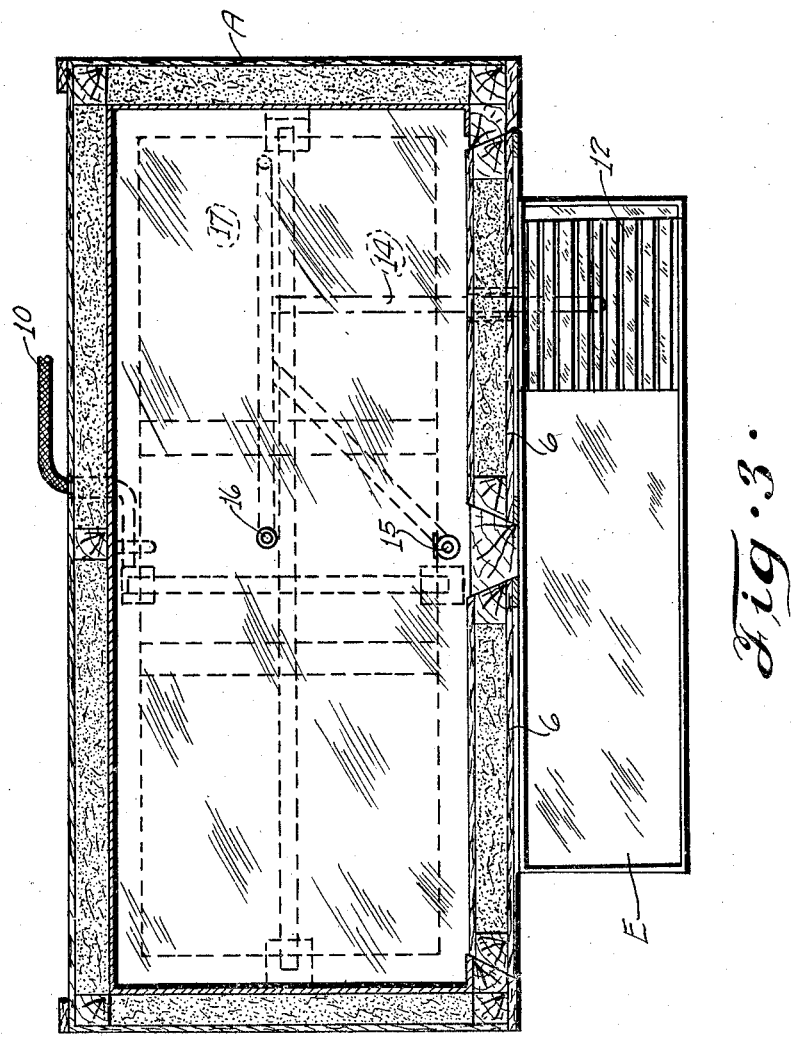
INVENTORS
Oscar P. Doerr.
William Stolberg.
By Bakewell & Church
ATTORNEYS Patented May 1, 1928.

1,668,195

UNITED STATES PATENT OFFICE.

OSCAR P. DOERR AND WILLIAM STOLBERG, OF ST. LOUIS, MISSOURI, ASSIGNORS TO ANHEUSER-BUSCH, INCORPORATED, OF ST. LOUIS, MISSOURI, A CORPORATION OF MISSOURI.

BEVERAGE-DISPENSING APPARATUS.

Application filed May 24, 1924. Serial No. 715,602.

This invention relates to apparatus of the kind used in dispensing beverages and other liquids which it is necessary or desirable to maintain in a cold condition.

One object of our invention is to provide an apparatus by means of which a beverage or other liquid can be dispensed in a cold condition from the original container in which it is delivered to the dealer, without the necessity of using a refrigerating coil or a hose through which the beverage flows, as has heretofore been necessary in the retail sale of draught beverages.

Another object is to provide a beverage dispensing apparatus that will maintain a beverage at a substantially uniform temperature and which is of such design that cracked ice and salt can be used as the refrigerant.

And still another object is to provide a beverage dispensing apparatus that is inexpensive to operate, which requires icing only once a day in ordinary weather, that is clean and sanitary and which will keep a beverage in its original condition for a week or more.

To this end we have devised a beverage dispensing apparatus that is composed of a double wall, insulated casing of such size that an original container which holds the liquid or beverage to be dispensed can be arranged inside of same, an ice tank in said casing filled with a mixture of crushed ice and salt and arranged so that air in said casing will be cooled by contact with said tank and thereafter circulated over said container, thus keeping the contents of same at the proper temperature, and a spigot, faucet or other suitable device directly connected to the container for permitting the contents of the container to be drawn directly from same into the glasses in which it is served to customers. The ice tank is so constructed and arranged that it can be filled easily from the exterior of the casing, and in most instances the container in the casing will be connected with a pressure supply pipe that maintains sufficient pressure in the container to effect the discharge of a carbonated beverage when the spigot or valve of the container is opened.

Figure 1 of the drawings is a front elevational view of a beverage dispensing apparatus constructed in accordance with our invention.

Figure 2 is a vertical sectional view of said apparatus; and

Figure 3 is a horizontal sectional view of said apparatus.

Figure 1:
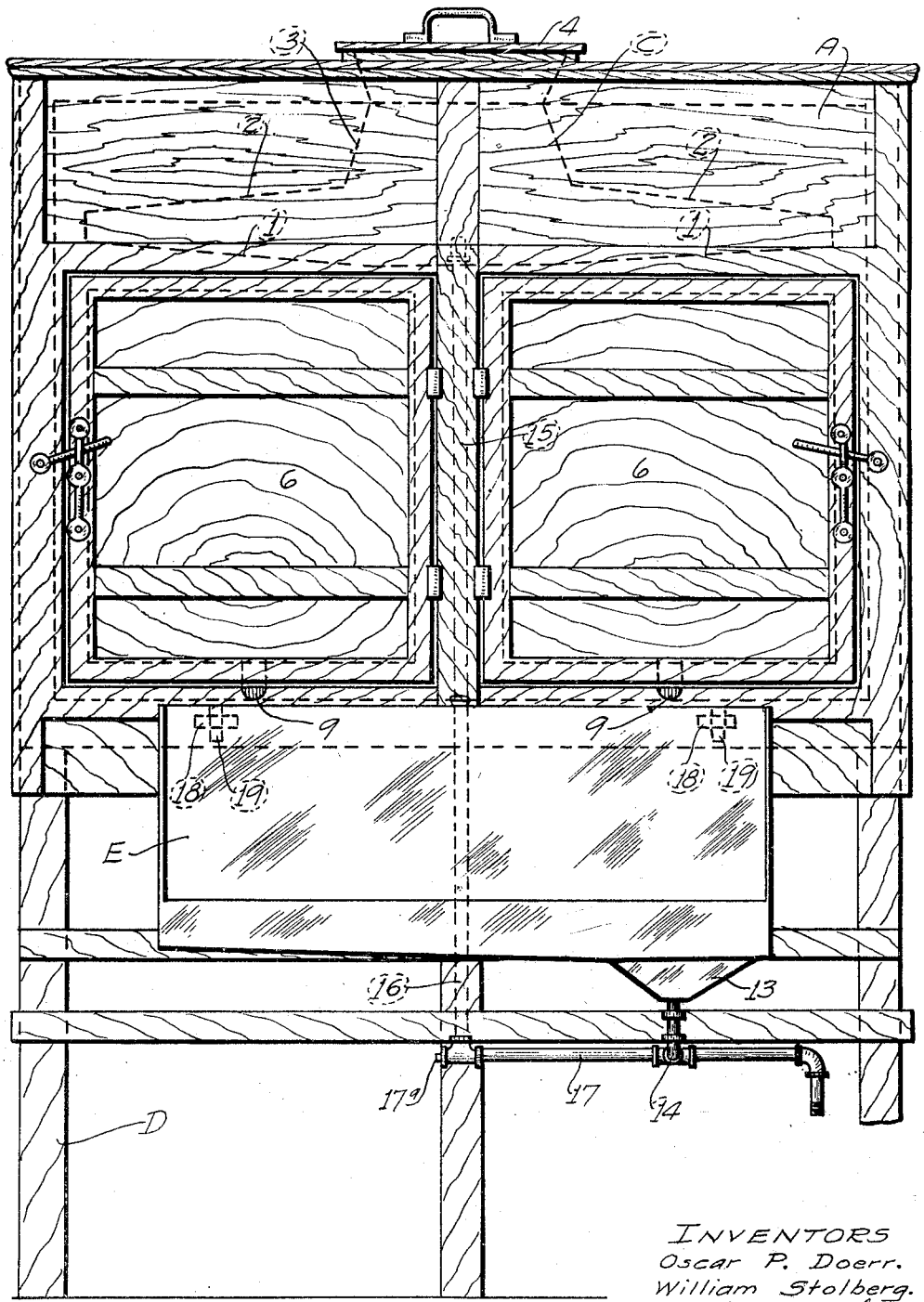

Referring to the drawings which illustrate the preferred form of our invention, A designates a double wall, insulated casing of any preferred form and construction that is adapted to hold one or more original containers B, shown in broken lines in Figure 2, in which the beverage or other liquid being dispensed is delivered to the retailer, and C designates an ice tank in said casing that is adapted to be filled with a mixture of crushed ice and salt, the casing A being preferably supported on legs D. In the apparatus herein shown the casing A is so constructed that two half barrels B of beverage can be arranged inside of same and the ice tank C is arranged in the upper portion of the casing and is so designed that the warm air in the casing will flow upwardly adjacent one of the walls of the casing, will then flow over the ice tank C through the space between said tank and the top of the casing, and after being cooled by contact with said ice tank, will flow downwardly and come in contact with the container or containers B in the casing. The particular shape of the ice tank C is immaterial, so long as it is of such form that it will induce an upward circulation of the warm air and effectively cool said air by surface contact, but we prefer to make the ice tank C of substantially oblong shape in horizontal section, provide it with a bottom composed of two portions 1 that slope downwardly from the ends of said tank towards the center of same, as shown in broken lines in Figure 1, and provide said tank with a top that is composed of two portions 2 that slope upwardly from the ends of the tank towards a hopper-like central portion 3 through which crushed ice and salt is introduced into the tank, said hopper-like central portion 3 being normally closed by a removable cover or lid 4. The sides of the ice tank C are spaced away from the front and rear walls of the casing A, as shown in Figure 2, and as the upwardly-sloping portions 2 of the top wall of said tank are spaced away from the top of the casing, ample space is provided between the ice tank and the casing to insure the air in the casing circulating around the ice tank and becoming effectively cooled by contact with said tank.

The containers B in the casing are preferably arranged in a slightly forwardly-tilted condition, as shown in Figure 2, so as to facilitate the withdrawal of the liquid or beverage in same, and while it is immaterial what means is used to support said containers, we prefer to provide the casing with inclined grates or racks 5 on which the containers B rest, thereby permitting the cold air to act on the bottoms of the containers as well as on the tops and sides of said containers. As shown in Figure 1, the front wall of the casing A is provided with two doors 6, each of which is arranged directly in front of one of the containers B so as to enable the containers to be easily introduced into and removed from the casing. Each container is provided with a faucet, spigot or other suitable draw-off device 7 mounted on a pipe 8 directly connected to the container and extending through the front wall of the casing. In order that the pipes 8 may be connected to the containers before the containers are positioned in the casing, each of the door openings in the front wall of the casing is provided in its bottom edge with a notch 9, as shown in Figure 1, that receives said pipe, said notch being deep enough so as to prevent the bottom edge of the door from rubbing against the pipe 8. If it is desired to maintain a pressure in the containers B so as to facilitate the withdrawal of the contents of the containers, each container can be connected with a carbonic acid gas supply pipe 10 by a fitting 11 that is connected to the head or upper end of the container, as shown in Figure 2.

A trough E is arranged on the front wall of the casing below the door openings in said wall so as to receive glasses or mugs in which the beverage or liquid in the containers B is served to customers, said trough being provided with an inclined bottom that leads to a grating 12 arranged over a funnel-shaped portion 13 at one end of the trough from which a drain pipe 14 leads. Drain pipes 15 and 16 lead from the ice tank C and from the floor of the compartment of the casing in which the containers B are arranged, and all of said drain pipes are preferably connected to a header 17 that can discharge into a pail or waste pipe that leads to a sewer, said header being provided at one end with a removable plug 17$^a$, as shown in Figure 1, so as to facilitate the cleaning of said header. If desired, the trough E can be detachably connected to the casing by co-operating devices 18 and 19 on said casing and trough which are shown in broken lines in Figure 1.

With an apparatus of the construction above described it is possible to dispense a beverage at the proper temperature from the container in which the beverage was delivered to the retailer, without liability of the beverage becoming tainted or losing its original taste or flavor, due to the fact that the beverage is not drawn through a hose and refrigerating coil and is not subjected to a wide fluctuation in temperature, as has heretofore been the case in dispensing draught beverages. In our apparatus the beverage is drawn directly from the original container into the glass in which the beverage is served, and while the beverage is in the container it is maintained at a substantially uniform temperature by cold air that circulates around the container. As the apparatus does not comprise a hose or refrigerating coil that requires frequent cleaning, it is easy to keep the apparatus in a clean and sanitary condition, and still another desirable feature of such an apparatus is its low cost of maintenance, as we have found that it is possible to keep a beverage at an average temperature of approximately 34° with approximately 50 lbs. of ice per day. One icing a day is sufficient to keep the beverage in the containers B at the required temperature, and a pressure of one-half a pound is sufficient to insure the discharge of a carbonated beverage from the containers B when the spigots of said containers are opened.

Having thus described our invention, what we claim as new and desire to secure by Letters Patent is:

An apparatus for dispensing beverages and other liquids, comprising a double wall, insulated casing provided in its front wall with a door opening through which an original container filled with a beverage that is to be dispensed can be introduced into the casing, a door for said opening, a grating in the casing for supporting said container, disposed so as to maintain the container in an inclined position with its upper end tilted forwardly, a notch in the bottom edge of the door opening in the front wall of the casing for receiving a spigot pipe that projects forwardly from the container, an elongated, transversely-disposed tank in the upper portion of the casing, adapted to be filled with a mixture of crushed ice and salt, and spaced away from the walls of the casing so as to permit air to circulate around the same, said tank having a bottom that slopes downwardly from the ends of the container towards the center of same, a hopper-like portion on the top wall of said tank having its upper end open and positioned in a hole in the top of the casing, a removable lid that serves as a closure for the hopper-like filling portion of said tank, a trough mounted on the front wall of the casing below the door opening in said wall, drains leading from said trough, from the low point of the central portion of the ice tank and from the part of the casing directly below said grating, and a header to which said drains are connected.

OSCAR P. DOERR.
WILLIAM STOLBERG.